(12) United States Patent
Suzuoki

(10) Patent No.: US 7,409,570 B2
(45) Date of Patent: Aug. 5, 2008

(54) MULTIPROCESSOR SYSTEM FOR DECRYPTING AND RESUMING EXECUTION OF AN EXECUTING PROGRAM AFTER TRANSFERRING THE PROGRAM CODE BETWEEN TWO PROCESSORS VIA A SHARED MAIN MEMORY UPON OCCURRENCE OF PREDETERMINED CONDITION

(75) Inventor: Masakazu Suzuoki, Austin, TX (US)

(73) Assignee: Sony Computer Entertainment Inc., Tokyo (JP)

( * ) Notice: Subject to any disclaimer, the term of this patent is extended or adjusted under 35 U.S.C. 154(b) by 456 days.

(21) Appl. No.: 11/125,495

(22) Filed: May 10, 2005

(65) Prior Publication Data

US 2006/0259743 A1  Nov. 16, 2006

(51) Int. Cl.
  *G06F 1/00* (2006.01)
  *G06F 1/26* (2006.01)
  *G06F 1/32* (2006.01)
(52) U.S. Cl. .............. 713/324; 713/300; 713/320; 713/323
(58) Field of Classification Search ............. 713/300, 713/320, 323, 324
  See application file for complete search history.

(56) References Cited

U.S. PATENT DOCUMENTS

| | | | |
|---|---|---|---|
| 5,615,263 A | 3/1997 | Takahashi | |
| 5,745,778 A | 4/1998 | Alfieri | |
| 5,913,068 A * | 6/1999 | Matoba | ............. 713/322 |
| 6,240,521 B1 * | 5/2001 | Barber et al. | ............. 713/323 |
| 6,247,041 B1 | 6/2001 | Krueger et al. | |
| 6,526,491 B2 | 2/2003 | Suzuoki et al. | |
| 6,631,474 B1 * | 10/2003 | Cai et al. | ............. 713/300 |
| 6,804,632 B2 * | 10/2004 | Orenstien et al. | ........... 702/188 |
| 7,086,058 B2 * | 8/2006 | Luick | ............. 718/102 |
| 7,093,147 B2 * | 8/2006 | Farkas et al. | ............. 713/320 |
| 2002/0002578 A1 | 1/2002 | Yamashita | |

(Continued)

FOREIGN PATENT DOCUMENTS

JP  2005-099984  4/2005

OTHER PUBLICATIONS

International Search Report and Written Opinion based on corresponding PCT/JP2006/309616, dated Feb. 5, 2007, 20 pgs.

(Continued)

*Primary Examiner*—Thomas Lee
*Assistant Examiner*—Jaweed A Abbaszadeh
(74) *Attorney, Agent, or Firm*—Matthew B. Dernier; Kaplan Gilman Gibson & Dernier LLP

(57) ABSTRACT

One or more processors within a computing system and the processor(s)' associated local memories may be operatively connected to a main memory enabling data transfer between the main memory and the local memories, in which the computing system can carry out actions that may include: generating a pause condition for one or more processors within a computing system; pausing the one or more processors; saving data from a local memory of the one or more processors to the main memory; hibernating the one or more processors; restoring power to the one or more processors; transferring the saved data originating from the one or more processors back to one originating processor or to designated destination processors in the computing system.

26 Claims, 12 Drawing Sheets

U.S. PATENT DOCUMENTS

2003/0079151 A1 4/2003 Bohrer et al.
2003/0110012 A1* 6/2003 Orenstien et al. ........... 702/188
2004/0215987 A1* 10/2004 Farkas et al. ................ 713/300
2005/0105738 A1 5/2005 Hashimoto

OTHER PUBLICATIONS

Invitation to Pay Additional Fees commenting on prior art based on corresponding international application PCT/JP2006/309616, dated Nov. 7, 2006, 8 pgs.

* cited by examiner

300

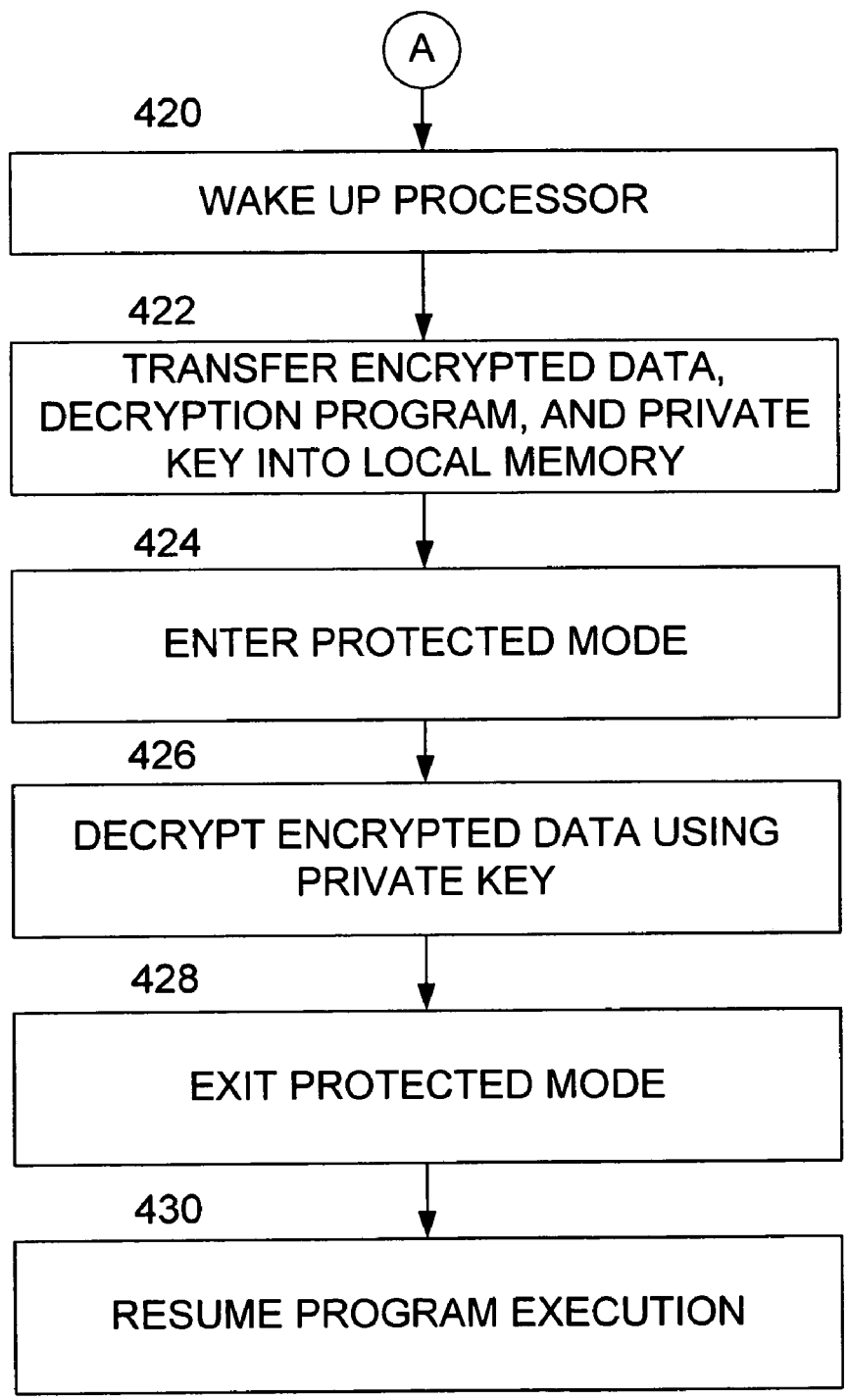

MULTIPROCESSOR SYSTEM FOR DECRYPTING AND RESUMING EXECUTION OF AN EXECUTING PROGRAM AFTER TRANSFERRING THE PROGRAM CODE BETWEEN TWO PROCESSORS VIA A SHARED MAIN MEMORY UPON OCCURRENCE OF PREDETERMINED CONDITION

BACKGROUND OF THE INVENTION

The present invention relates to methods and apparatus for managing power consumption and heat buildup in a computing system and managing the distribution of computational activity among processors in a multiprocessor computing system.

The increasing clock frequencies and decreasing size of modern microprocessors have generated enormous improvements in computing performance and the convenience of providing such performance within a small footprint. However, these improvements have also led to increased power consumption and considerable heat buildup in the microprocessors. This is particularly true of graphics processors. Thus, there is a need in the art for a software-based solution to the problem of microprocessor heat buildup either in place of, or in addition to, hardware solutions such as the deployment of heat sinks.

In multiprocessor computing systems, the problem of heat buildup may be aggravated by the concentration of a plurality of high-performance processors within a limited space and by an uneven distribution of processing activity among the processors. Such an uneven distribution of computational activity may lead to the generation of local "hot spots" as some processors process more total computational throughput and experience correspondingly greater thermal energy buildup than less active processors within the same computing system. Accordingly, there is a need in the art for a software solution to the problem of hot spots in multiprocessor systems.

SUMMARY OF THE INVENTION

According to one aspect, the present invention provides a method including: pausing operation of a processor within a computing system upon encountering a checkpoint instruction in a program executing in the processor; saving data from a local memory of the processor to a main memory of the computing system; and hibernating the processor. Preferably, the method further comprises encrypting the data in the local memory prior to the saving. Preferably, the method further comprises: waking up the hibernated processor upon detection of a wake-up condition. Preferably, the method further comprises: transferring the saved data from the main memory to the local memory of the processor. Preferably, the method further comprises: encrypting the data in the local memory prior to the saving; entering a protected mode by the processor after the waking up; decrypting the transferred data; and exiting the protected mode by the processor.

Preferably, entering the protected mode comprises entering an isolated mode in which data transfer into and out of the processor is prohibited. Preferably, entering the protected mode comprises entering a secure mode in which no requests from a device external to the processor for data transfer into or out of the local memory of the processor will be serviced. Preferably, the method further comprises resuming the operation of the processor. Preferably, hibernating the processor comprises turning off power to the processor. Preferably, hibernating the processor comprises substantially reducing a power consumption level of the processor. Preferably, hibernating the processor comprises at least substantially reducing a power consumption level of the processor. Preferably, hibernating the processor comprises cutting off a clock signal to the processor.

Preferably, waking up the processor comprises restoring full power to the processor; and initializing the processor. Preferably, waking up the processor comprises at least substantially restoring power to the processor. Preferably, the method further comprises informing the processor of its stage of progress in a processor operation resumption procedure.

Preferably, waking up comprises informing the hibernated processor of an existence of a wake-up condition; and issuing from the processor a signal to restore full power to the processor. Preferably, informing comprises transmitting an interrupt to the hibernated processor. Preferably, the method further comprises generating the wake-up condition based on an expiration of a predetermined time period. Preferably, the predetermined time period equals a hibernation period of the processor. Preferably, the method further comprises generating the wake-up condition upon the execution of a checkpoint instruction in a second processor in communication with the hibernated processor. Preferably, the method further comprises: transferring the saved data from the main memory to a local memory of a second processor; and resuming the execution of the program in the second processor.

According to another aspect, the invention provides a method comprising: waiting for an expiration of an execution period of predetermined duration by at least one processor in a first multiprocessor system; pausing ongoing program execution in the at least one processor upon the expiration of the execution period, thereby providing at least one paused processor; and saving data from at least one respective local memory of the at least one processor to a main memory of the first multiprocessor system. Preferably, the method further comprises designating a destination processor for each the paused processor, thereby providing at least one destination processor; transferring the saved data from the main memory to at least one respective local memory of the at least one destination processor; and resuming the ongoing program execution in the at least one destination processor, thereby starting a new execution period. Preferably, the method further comprises encrypting the data in the at least one local memory of the at least one paused processor prior to the saving. Preferably, the method further comprises entering a protected mode by the at least one destination processor; decrypting the transferred encrypted data; and exiting the protected mode by the at least one destination processor.

Preferably, entering the protected mode comprises entering an isolated mode in which data transfer into and out of the at least one destination processor is prohibited. Preferably, entering the protected mode comprises entering a secure mode in which no requests from a device external to the at least one destination processor for data transfer into or out of the at least one destination processor will be serviced. Preferably, the method further comprises repeating the waiting, the pausing, the saving, the designating, the transferring and the resuming. Preferably, the at least one paused processor comprises at least two paused processors, and wherein the designating comprises designating a destination processor for each of the paused processors according to a processor data relocation scheme.

Preferably, the execution period is substantially equal to a frame processing time of the at least one processor. Preferably, the execution period is about 16 milliseconds. Preferably, the duration of the execution period is substantially less than a critical thermal rise time of the at least one processor. Preferably, the at least one destination processor is located in the first multiprocessor system. Preferably, at least one of the at least one destination processor is located on a second multiprocessor system. Preferably, the method further comprises copying all data from the main memory of the first multiprocessor system to a main memory of the second multiprocessor system. Preferably, the processor data relocation scheme comprises modulo "n" rotation, wherein "n" is a number of processors on the first multiprocessor system.

According to another aspect, the invention provides a computing system having at least one processor capable of operative communication with a main memory; and a local memory coupled to each of the at least one processor, thereby providing at least one local memory, wherein the computing system is operable to pause operation of the at least one processor within the computing system upon encountering a checkpoint instruction in a program executing in the at least one processor, thereby providing at least one paused processor, save data from the local memory of the at least one paused processor to the main memory of the computing system; and hibernate the at least one paused processor.

According to another aspect, the invention provides a computing system having at least one processor capable of operative communication with a main memory; and a local memory coupled to each of the at least one processor, thereby providing at least one local memory, wherein the computing system is operable to: wait for an expiration of an execution period of predetermined duration by the at least one processor in a first multiprocessor system of the computing system, pause ongoing program execution in the at least one processor upon the expiration of the execution period, thereby providing at least one paused processor, and save data from the at least one local memory of the at least one paused processor to the main memory of the first multiprocessor system.

According to another aspect, the invention provides a storage medium containing an executable program, the executable program being operable to cause a computing system to execute actions including: pausing operation of a processor within the computing system upon encountering a checkpoint instruction in a program executing in the processor; saving data from a local memory of the processor to a main memory of the computing system; and hibernating the processor.

According to another aspect, the invention provides a storage medium containing an executable program, the executable program being operable to cause a computing system to execute actions including: waiting for an expiration of an execution period of predetermined duration by at least one processor in a first multiprocessor system; pausing ongoing program execution in the at least one processor upon the expiration of the execution period, thereby providing at least one paused processor; and saving data from at least one respective local memory of the at least one processor to a main memory of the first multiprocessor system.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 4B is a second portion of the flow diagram shown in FIG. 4A illustrating process steps that may be carried out accordance with one or more aspects of the present invention;

DETAILED DESCRIPTION OF THE PREFERRED EMBODIMENTS

Figure 1:
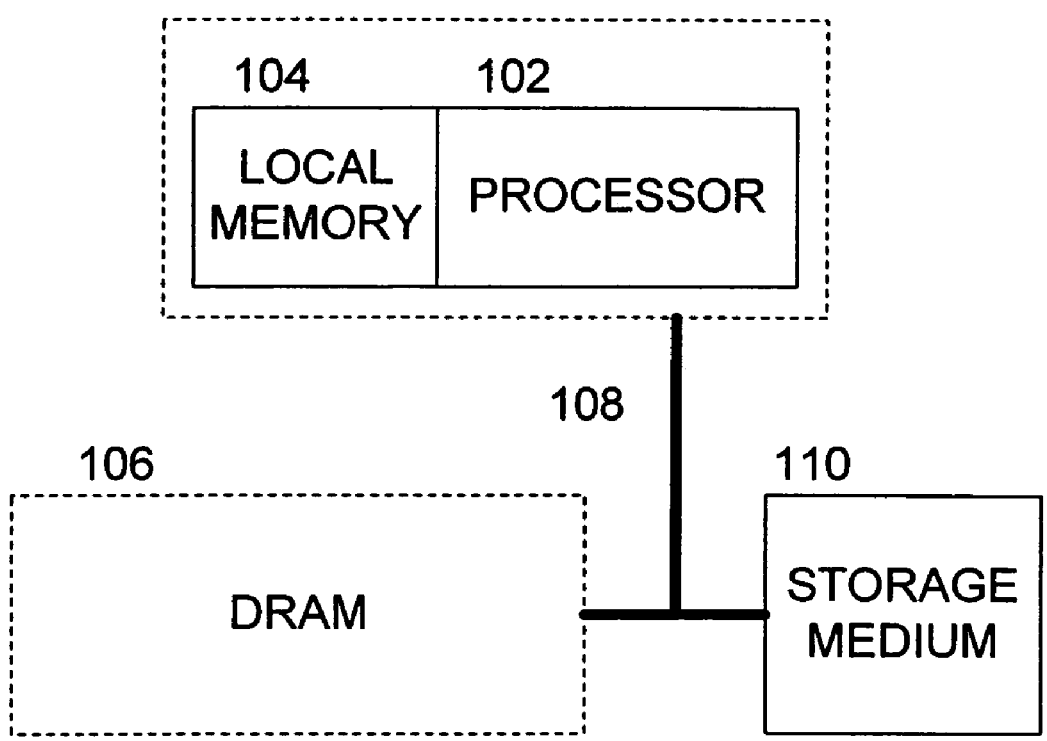
FIG. 1 is a block diagram illustrating a processing system in suitable for use in accordance with one or more aspects of the present invention.

In this disclosure, in the context of saving data stored in a processor's local memory, the term "data" includes all data including executable program code in addition to numerical and textual information processed by the program code. Herein, the term "broadband engine," which may also be referred to as a processor element, is a multi-processor computing system. Herein, the term "hibernation" generally refers to a processor condition in which the processor uses less power and/or dissipates less power than when operating normally. Thus, such hibernation includes processor conditions covering a range of power consumption or dissipation levels from what is merely a reduced level of power consumption or dissipation all the way down to a zero or near-zero level of processor power consumption or dissipation.

Correspondingly, the term "hibernating" a processor (and other conjugations of this verb) refers to placing a processor in such a low-power consumption and/or low-power dissipation condition or zero-power consumption and/or zero-power dissipation condition. Hibernating a processor may be achieved by reducing, either partially or completely, the voltage supplied to a processor. Alternatively, the current to the processor could be partially or completely reduced. In another embodiment, the clock signal to the processor could be reduced by varying degrees or completely cut off. Additionally, a combination of one or more of the foregoing approaches to reducing or eliminating power to the processor may be employed. Moreover, the present invention is not limited to the use of one or more of the above approaches to hibernate a processor. Furthermore, the term hibernation is not limited to the above definition.

Herein, the term "waking up" a processor may refer to restoring power or clock signaling to the processor. Correspondingly, a "wake-up condition" is an condition indicative of a request to wake up a processor. However, the term "waking up" is not limited to the above definition.

Herein, the term "checkpoint" generally refers to a program instruction or instructions indicative of a desired processor status and/or of a condition of the processor or of a computing system in which the processor is located. In one embodiment, a checkpoint in a processor's program code instructs the processor to enter a hibernation condition which is also known as a hibernation state. In one embodiment, one or more of a plurality of possible hibernation-state power levels could be specified in a checkpoint instruction. In another embodiment, a checkpoint may instruct one or more processors to shift the contents of one or more respective local memories to memory external to the respective processors. It will be noted that checkpoints may be employed to indicate statuses and/or instructions in addition to those noted above. Moreover, the term "checkpoint" is not limited to the definitions stated above.

Herein, the term "hot spot" may refer to a location within an apparatus which is at a higher-than-desired temperature. In one embodiment, a hot spot may exist if a location within the apparatus is hotter than a threshold temperature, where the threshold may be predetermined or may be adjustable during operation of the apparatus.

In one embodiment, the term "hot spot" may refer to a processor in a multi-processor computing system which is the hottest (at the highest temperature) of any processor in the multi-processor computing system. Alternatively, the term "hot spot" may refer to a processor which is at a higher temperature than the majority of the other processors in the multi-processor computing system. However, the term "hot spot" is not limited to the above definitions.

Herein, the term "computing system" may refer to an apparatus for computing. In one embodiment, a computing system may be a single processor. In another embodiment, a computing system may be a multi-processor device such as a broadband engine, which is also known as a processor element (PE). In yet another embodiment, the term "computing system" may refer to an apparatus including a plurality of multiprocessor systems and possibly including other devices including but not limited to memories external to the multi-processor systems, data transmission apparatus such as bus systems, and data communication control devices. However, the term "computing system" is not limited to the above definitions.

Herein, the terms "ongoing program execution" and "ongoing execution" may refer to operations other than those conducted to implement processor data relocation procedures and/or processor hibernation. However, the term "ongoing program execution" is not limited to the foregoing definition. Herein, "pausing" a processor may refer to discontinuing this ongoing program execution. After being paused, the processors are preferably still able to perform tasks associated with the hibernation and processor data relocation procedures. However, the term "paused" is not limited to the foregoing definition.

With reference to the drawings, wherein like numerals indicate like elements, there is shown in FIG. 1 a processing system 100 suitable for employing one or more aspects of the present invention. For the purposes of brevity and clarity, the block diagram of FIG. 1 will be referred to and described herein as illustrating an apparatus 100, it being understood, however, that the description may readily be applied to various aspects of a method with equal force. The apparatus 100 preferably includes a processor 102, a local memory 104, a system memory 106, which is preferably a Dynamic Random Access Memory (DRAM), and a bus 108.

The processor 102 may be implemented utilizing any of the known technologies that are capable of requesting data from the system memory 106, and manipulating the data to achieve a desirable result. For example, the processor 102 may be implemented using any of the known microprocessors that are capable of executing software and/or firmware, including standard microprocessors, distributed microprocessors, etc. By way of example, the processor 102 may be a graphics processor that is capable of requesting and manipulating data, such as pixel data, including gray scale information, color information, texture data, polygonal information, video frame information, etc.

Notably, the local memory 104 is preferably located in the same chip as the processor 102; however, the local memory 104 is preferably not a hardware cache memory in that there are preferably no on chip or off chip hardware cache circuits, cache registers, cache memory controllers, etc. to implement a hardware cache memory function. In alternative embodiments, the local memory 104 may be a cache memory and/or an additional cache memory may be employed. As on-chip space is often limited, the size of the local memory 104 may be much smaller than the system memory 106. The processor 102 preferably provides data access requests to copy data (which may include program data) from the system memory 106 over the bus 108 into the local memory 104 for program execution and data manipulation. The mechanism for facilitating data access may be implemented utilizing any of the known techniques, such as direct memory access (DMA) techniques.

The apparatus 100 also preferably includes a storage medium, such a read only memory (ROM), that is operatively coupled to the processor 102, such as through the bus 108. The storage medium 110 preferably contains a trusted decryption program that is readable into the local memory 104 of the processor 102 and operable to decrypt information using a secure decryption key. Preferably, the storage medium 110 is a permanently programmable device (e.g., a flash ROM) in which a level of security is achieved such that the decryption program yields a trusted function and cannot be tampered with by external software manipulation. The security of the storage medium 110 is preferably such that the decryption program and/or other information (such as a trusted decryption key) may not be accessed by unauthorized entities. For example, the decryption program is preferably established and stored in the storage medium 110 during the manufacture of the apparatus 100.

It is preferred that the processor 102 and the local memory 104 are disposed on a common integrated circuit. Thus, these elements may be referred to herein as "the processor 102." In an alternative embodiment, the storage medium 110 may also be disposed on the common integrated circuit with one or more of the other elements.

Figure 2:
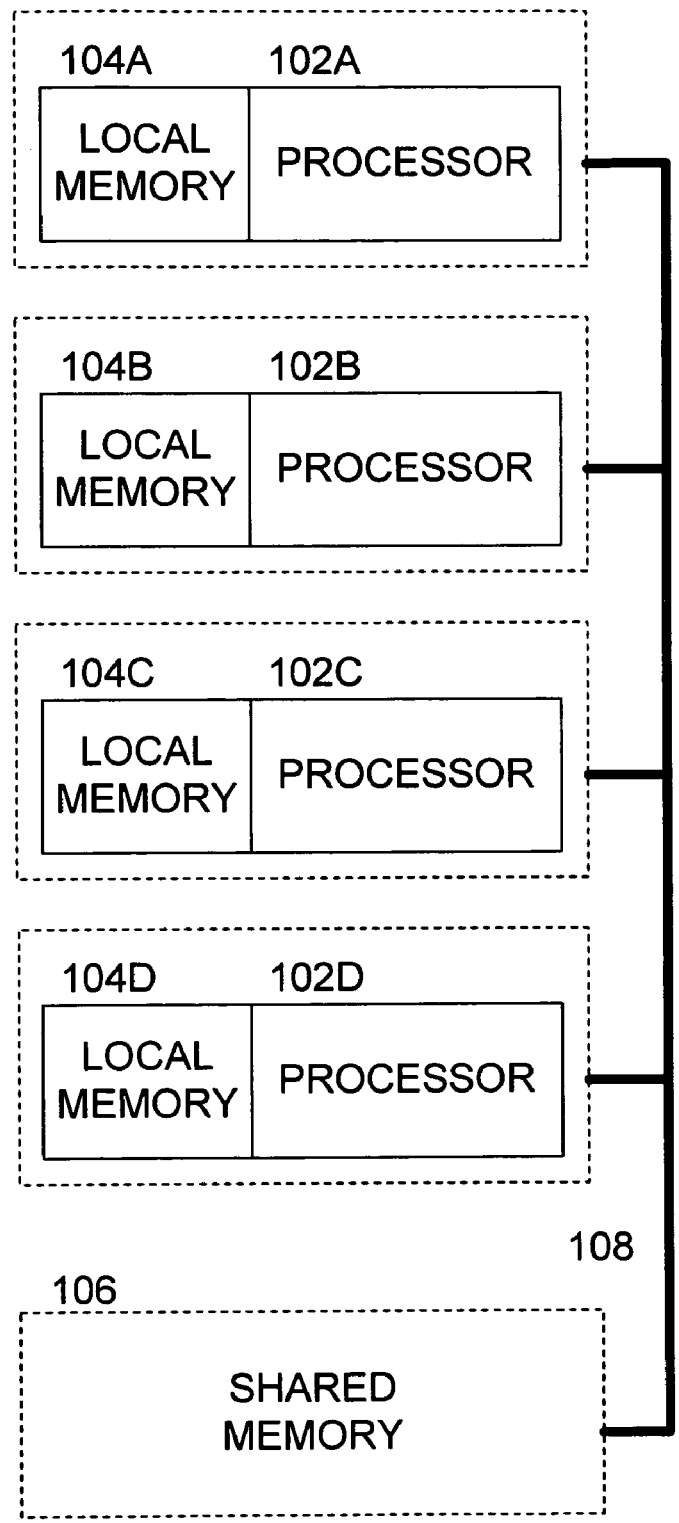
FIG. 2 is a diagram illustrating the structure of a multi-processing system having two or more sub-processors (SPUs) that may be used in accordance with one or more aspects of the present invention.

FIG. 2 is a diagram illustrating the structure of a multiprocessor system 100A (also referred to herein as a multiprocessing system) having two or more sub-processors 102. The concepts elsewhere herein may be applied to the multiprocessor system 100A. The system 100A includes a plurality of processors 102A-102D, associated local memories 104A-104D, and a shared memory 106 interconnected by way of bus system 108. Shared memory 106 may also be referred to herein as main memory 106 or system memory 106. Although four processors 102 are illustrated by way of example, any number of processors may be utilized without departing from the spirit and scope of the present invention. The processors 102 may all be of the same construction or may include differing construction.

The local memories 104 are preferably located on the same chip (same semiconductor substrate) as their respective processors 102. However, the local memories 104 are preferably not traditional hardware cache memories in that there are no on-chip or off-chip hardware cache circuits, cache registers, cache memory controllers, etc. to implement a hardware cache memory function.

The processors 102 preferably provide data access requests to copy data (which may include program data) from the system memory 106 over the bus system 108 into their respective local memories 104 for program execution and data manipulation. The mechanism for facilitating data access is preferably implemented utilizing a Direct Memory Access Controller (DMAC) for each processor (not shown). The DMAC of each processor is preferably of substantially the same capabilities as discussed elsewhere herein with respect to other features of the invention.

The system memory 106 is preferably a Dynamic Random Access Memory (DRAM) coupled to the processors 102 through a high bandwidth memory connection (not shown). Additionally or alternatively, DRAM 106 may be connected to processors 102 via bus system 108. Although the system memory 106 is preferably a DRAM, the memory 106 may be implemented using other means, e.g., a Static Random Access Memory (SRAM), a Magnetic Random Access Memory (MRAM), an optical memory, a holographic memory, etc.

Each processor 102 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

In one or more embodiments, the processors 102 and the local memories 104 may be disposed on a common semiconductor substrate. In one or more further embodiments, the shared memory 106 may also be disposed on the common semiconductor substrate, or it may be separately disposed, such as on a separate semiconductor substrate.

In one or more alternative embodiments, one or more of the processors 102 may operate as a main processor operatively coupled to the other processors 102 and capable of being coupled to the shared memory 106 over the bus 108. The main processor may schedule and orchestrate the processing of data by the other processors 102. Unlike the other processors 102, however, the main processor may be coupled to a hardware cache memory, which is operable cache data obtained from at least one of the shared memory 106 and one or more of the local memories 104 of the processors 102. The main processor may provide data access requests to copy data (which may include program data) from the system memory 106 over the bus 108 into the cache memory for program execution and data manipulation utilizing any of the known techniques, such as DMA techniques.

In one embodiment, multi-processing system 110A may further include a storage medium (not shown) coupled to shared memory 106 and processors 102A-102D either directly or via bus system 108. This storage medium may be Random Access Memory (RAM), Read Only Memory (ROM), DRAM, Programmable Read Only Memory (PROM) or other conventional data storage implementation. Moreover, additional data storage devices (not shown) may also be coupled to shared memory 106 and/or processors 102A-102D either directly or via bus system 108.

Figure 3:
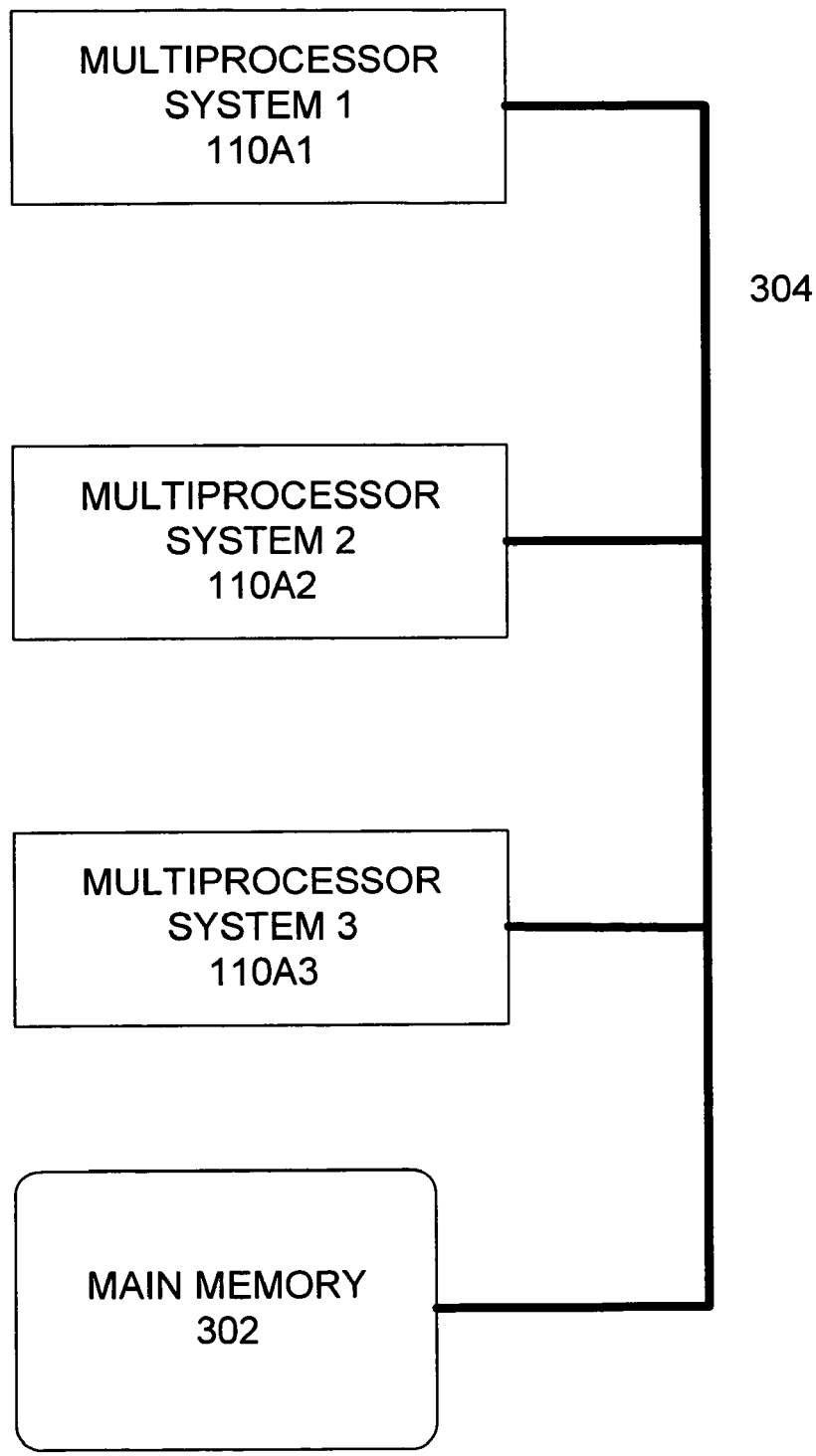
FIG. 3 is a block diagram of a computing system including a plurality of the multi-processing systems (or "multiprocessor systems") of FIG. 2 which may be used in accordance with one or more aspects of the present invention.

FIG. 3 is a block diagram of a computing system 300 including a plurality of multi-processor systems suitable for use in accordance with one or more aspects of the present invention. Multiprocessor systems 100A1-100A3 may be equivalent to multiprocessor system 110A of FIG. 2 but are not limited to this implementation. Computing system 300 may further include main memory 302 and additional storage devices incorporating volatile and/or non-volatile memory (not shown) and/or random access and/or sequential memory access data storage devices (not shown). Computing system 300 preferably further includes bus 304. Computing system 300 may also include further data communication and datacommunication control apparatus (not shown). For the sake of simplicity, illustration of the internal structure of each of multi-processor systems 100A1-100A3 has been omitted in FIG. 3.

Figure 4A:
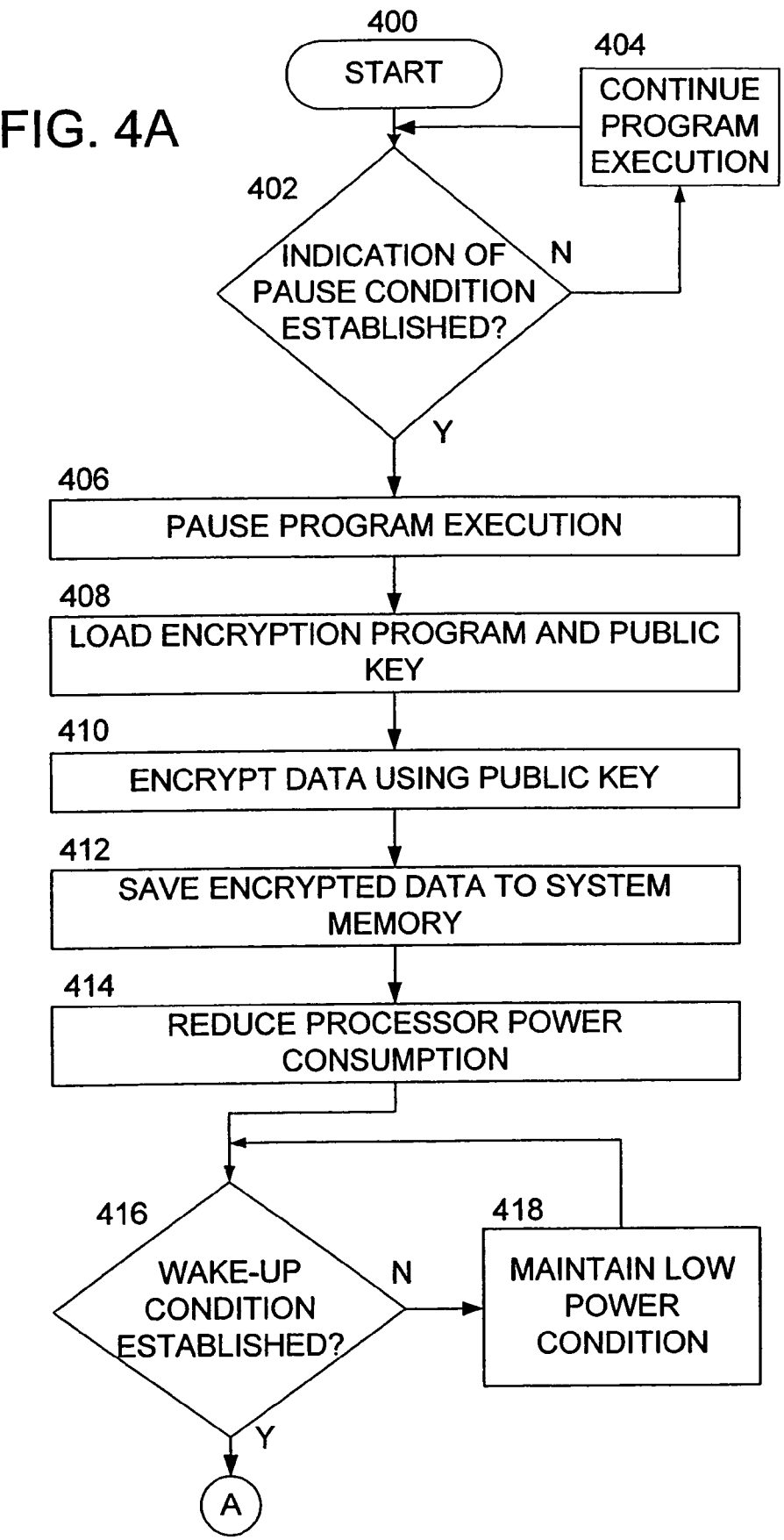
FIG. 4A is a first portion of a flow diagram illustrating process steps that may be carried out in connection with a hibernation procedure and a resumption of processor operation procedure in accordance with one or more aspects of the present invention.

FIGS. 4A and 4B (referred to collectively as FIG. 4) together form a flow diagram illustrating process steps that may be carried out in connection with a hibernation procedure and a processor wake-up procedure in accordance with one or more aspects of the present invention. Below, reference is made to FIGS. 4-6 in connection with the description of the sequence of process steps of FIG. 4.

The process starts at action 400. At action 402, a computing system, which may be a single processor 102, preferably determines whether a pause condition has been established. If there is no pause condition, ongoing program execution preferably continues at action 404. If a pause condition has been established, the process continues at action 406, which is discussed below.

In a preferred embodiment, the pause condition is generated by the processor 102 encountering a checkpoint instruction in a program being executed in that processor 102, which checkpoint instruction indicates to the processor 102 that it is time for the processor 102 to undergo a hibernation procedure. However, in alternative embodiments, the processor to be hibernated may receive the pertinent indication from another device connected to the processor 102. For example, in a multi-processor system, one processor could transmit a signal indicative of the establishment of a pause condition to itself and/or to one or more other processors within the multiprocessor system.

In another alternative embodiment, a timer (either software-driven or hardware-driven), operatively coupled to the processor 102 to be paused, could time out and transmit an interrupt signal to the processor 102, the signal indicative of a pause condition. In this manner, a pause condition could be established according to a real-time schedule.

In another embodiment, the pause condition could be generated based on the occurrence of one or more specified events within the computing system. Such events may include but are not limited to: a workload level for a computing system, in which the processor to be paused is located, falling below a specified threshold and the occurrence of thermal condition within the computing system, such as a test point in the computing system rising above some threshold temperature. Moreover, in one alternative embodiment, the specified event could be the execution of a checkpoint instruction by a processor in communication with the processor 102 to be paused.

At action 406, given the establishment of a pause condition, program execution in the processor 102 is preferably paused.

Figure 5:
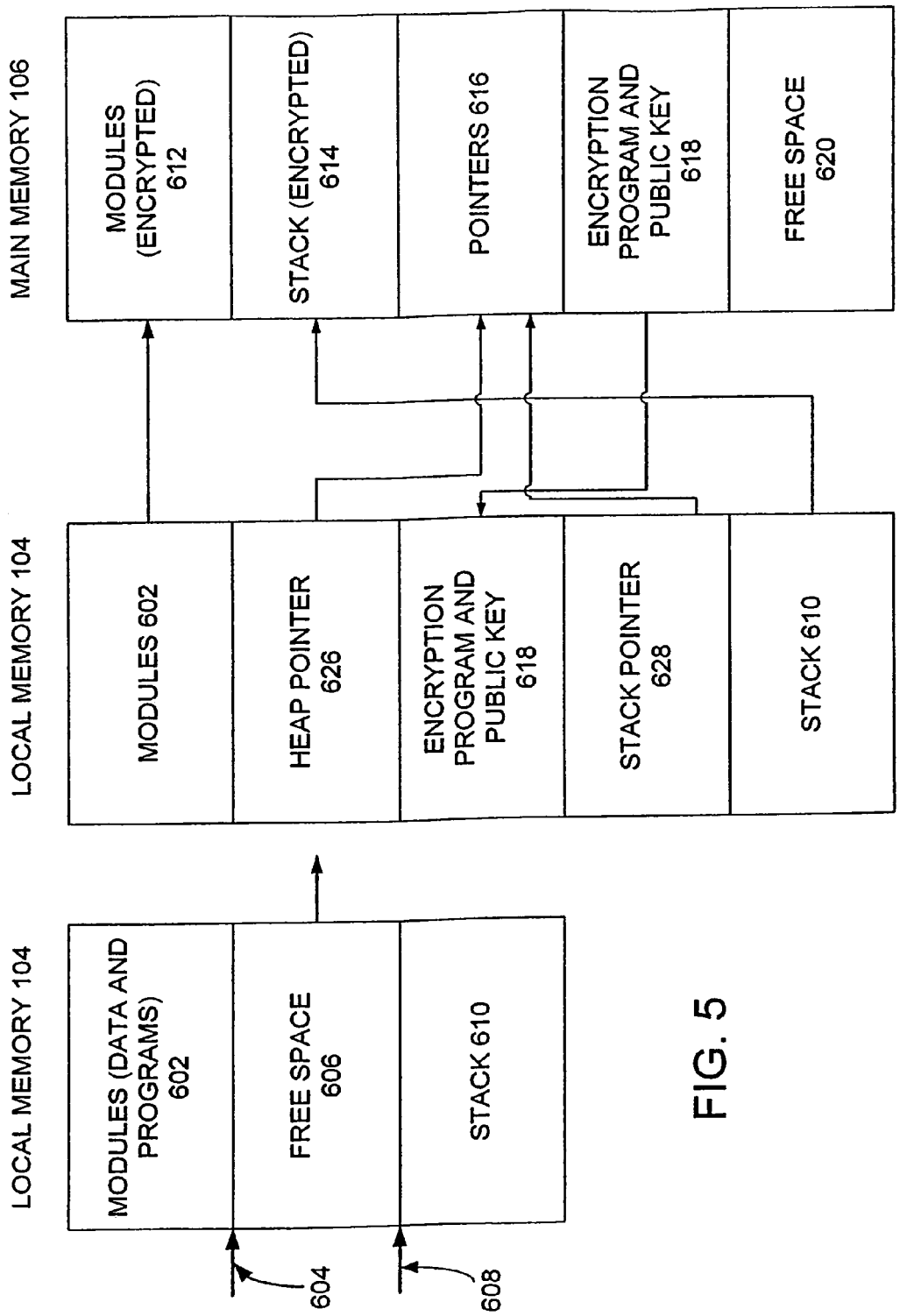
FIG. 5 is a block diagram illustrating the handling of data during a hibernation procedure in accordance with one or more aspects of the present invention.

With reference to FIG. 5, in the first block illustrating local memory 104, the locations of heap pointer 604 and stack pointer 606 are shown. The arrow pointing from the first block illustrating local memory 104 to the second block illustrating local memory 104 points generally to the transition between these two blocks and does not specifically map the transfer of data between any two memory locations.

Arrows 604 and 608 preferably identify the locations of the heap pointer and the stack pointer, respectively, in local memory 104. Preferably, information describing the locations of pointers 604 and 608 is stored in local memory 104, in blocks 626 and 628 respectively, for later transfer to main memory 106 and ultimate restoration to local memory 104.

With reference to FIGS. 4 and 5, at action 408, an encryption program and public key 618 are preferably loaded into free space 606 of local memory 104 from main memory 106. At action 410, the data 602 in local memory 104 are preferably encrypted using the encryption program and public key 618. Preferably, stack 610 is also encrypted in action 410. The encryption program itself may also be encrypted. At action 412, the encrypted programs and data (together known as "modules") 612 are preferably saved to system memory 106. Encrypted stack 614 is also preferably saved to system memory 106. Preferably, heap pointer 604 and stack pointer 608 in local memory 104 are saved to main memory 106. The combination of pointers 604 and 608 as stored in main memory 106 are designated with reference numeral 616. The Pointers 604 and 608 are preferably not encrypted prior to being saved to the main memory 106. However, in an alternative embodiment, the pointers 604 and 608 may be encrypted prior to their being saved to the main memory 106. Once action 412 is complete, main memory 106 may have remaining free space 620.

At action 414, power consumption by the processor 102 is reduced, thereby placing the processor 102 in a hibernation state. In one embodiment, in the hibernation state, the processor's 102 power usage is zero, or near-zero. In other embodiments, a hibernated processor 102 may have a processor power consumption level that is lower by varying amounts in comparison with the processor's 102 normal operating power level. In one embodiment, the entity directing a selected processor to enter a hibernation state could select a desired hibernation power level and carry out actions to bring the processor to be hibernated at the selected hibernation power level. The pertinent "entity" may be the processor 102 itself or a device in communication with the processor to be hibernated.

At action 416, a decision is made as to whether a processor wake-up condition has been established. Depending on the processor's 102 power level, this decision may be made either by the hibernating processor 102 itself or by another device in communication with the hibernated processor 102. Specifically, if power to the hibernating processor 102 is completely turned off, the wake-up condition is preferably detected by a device other than the hibernating processor 102. Alternatively, if the hibernating processor's 102 operating condition is such as to enable some basic communication activity (such as by virtue of a non-zero power supply level), such as the detection of an interrupt signal or the receipt of serial or parallel data communication, the hibernating processor 102 itself may detect the wake-up condition.

In some embodiments, the generation of a processor resumption condition may result from the expiration of a specified time period, by an event occurring within the processor 102, or by an event occurring elsewhere within the computing system in which the hibernated processor 102 is located. In one embodiment, the processor wake-up condition may be established when another processor in communication with the hibernating processor 102 encounters a program instruction, such as a program checkpoint, indicative of a processor wake-up condition. In another embodiment, when a workload level for one or more other processors in communication with the hibernating processor 102, or for the computing system in which the hibernating processor 102 is located, rises above a specified threshold value, a processor wake-up condition may be generated.

In an embodiment in which power to the hibernating processor 102 is completely turned off, another processor (a "detecting processor"), or other suitable device, in communication with the hibernating processor 102, preferably detects the processor wake-up condition. Thereafter, power to the hibernating processor 102 is preferably turned back on, thereby waking up (or "awakening") the hibernated processor 102. If needed, the awakened processor then preferably goes through a conventional initialization procedure. Thereafter, the detecting processor preferably communicates to the awakened processor 102 the fact that it has been awakened from a hibernation state to direct the awakened processor 102 to its next action. Preferably, this next action will be action 420, discussed below. The communication of the awakened processor's 102 status may be accomplished via transmission of an interrupt signal, via transmission of data over a bus system or by other known communication methods. In some embodiments, a plurality of different interrupts could be employed to trigger a range of possible post-wake-up actions by the awakened processor 102.

In an embodiment in which the power level of the hibernating processor 102 is high enough to enable rudimentary processor operation, an interrupt may be sent to the hibernating processor 102 to indicate a processor wake-up condition. Thereafter, the awakened processor 102 may itself select the next action to be carried out. Alternatively, an external device could send a second interrupt which directs the resumed processor to the next action to be carried out.

Returning to action 416, if the resumption condition is not established, the low-power or zero-power level of the hibernating processor 102 is preferably maintained at action 418. If the wake-up condition is established, operating power is preferably restored to processor 102 at action 420.

Figure 6:
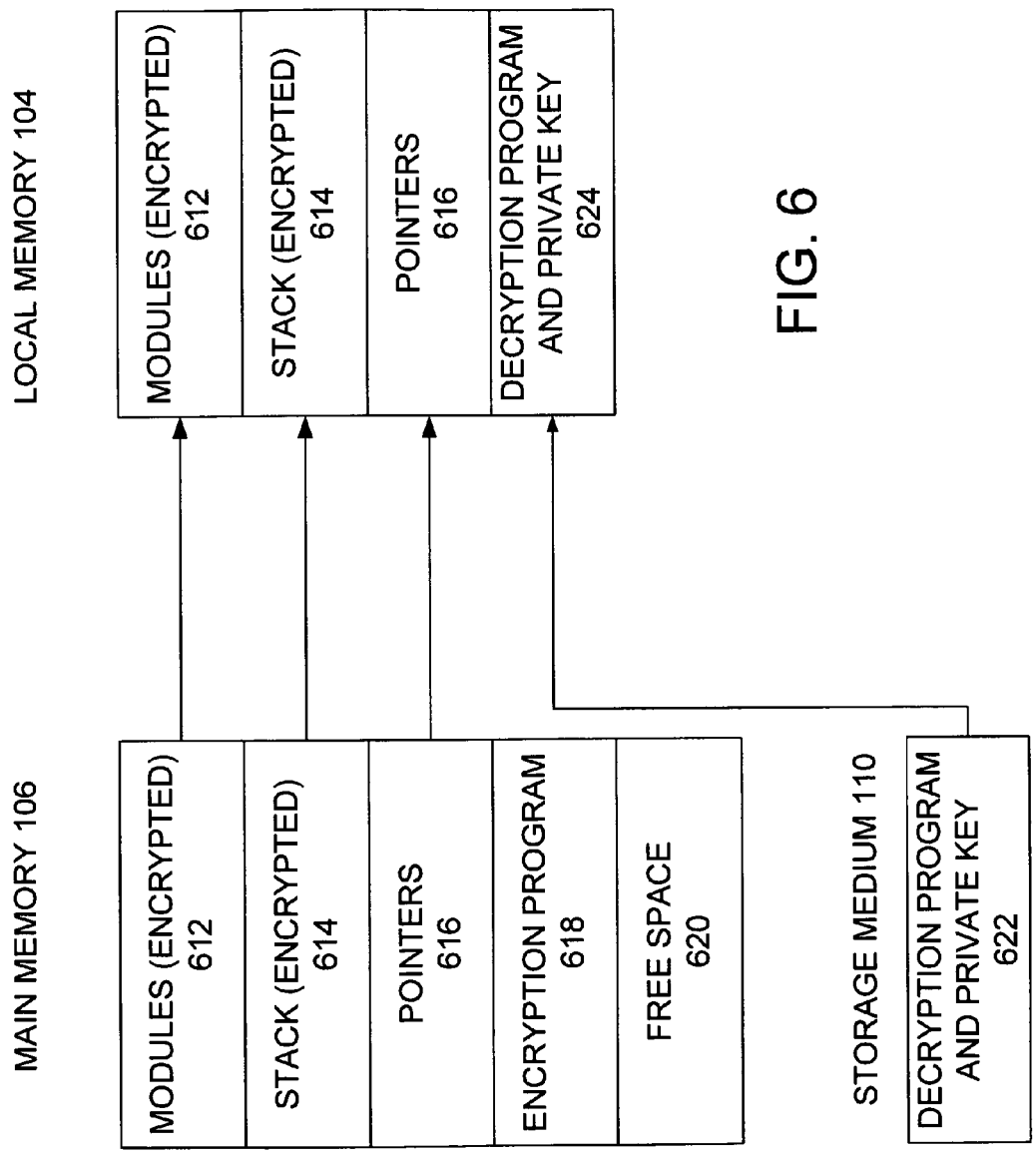
FIG. 6 is a block diagram illustrating the handling of data during a resumption of processor operation procedure from a hibernation state according to one or more aspects of the present invention.

With reference to FIGS. 4 and 6, at action 422, the processor 102 preferably transfers encrypted modules 612, encrypted stack 614, and pointers 616 (preferably unencrypted) from main memory 106 into local memory 104. The processor 102 also preferably loads decryption program and private key 602 into local memory 104 from storage medium 110. It is noted here that decryption program and private key, collectively, are referred to herein with reference numeral 602. In a preferred embodiment, storage medium 110 is preferably volatile Read-Only Memory (ROM). However, in alternative embodiments, other highly trusted memory may be employed as storage medium 110.

In general the processor 102 is operable to change status in order to achieve various conditional states. These states will be briefly introduced and then discussed in more detail below. In a first state, the processor 102 is in a normal mode. The processor 102 is preferably operable to transition to a second state, where the processor 102 is in a protected mode of operation. The processor 102 is also preferably operable to transition to a third state in which trusted decryption code may be invoked and executed within the processor 102.

Two protected modes are contemplated in this disclosure, these modes offering varying degrees of insulation of the processor's local memory 104 from potentially destructive interaction with memory external to the processor 102. The modes discussed in this section are the secure mode and the isolated mode.

In the secure mode of operation, no requests for data stored in the local memory 104 (or any other memory devices, registers, etc.) of the processor 102 will be serviced, thereby insuring a trusted environment in which to carry out sensitive operations. Despite being in a secure mode, the processor 102 may request the transfer of data from the system memory 106 into the local memory 104, or may request the transfer of data from the local memory 104 to the system memory 106. Still further, the processor 102 may initiate the transfer of data into and out of the trusted environment irrespective of the source or destination while in the secure mode of operation. In a preferred embodiment, the trusted environment is limited to processor 102 and its included local memory 104 when in one of the protected modes of operation.

In the isolated mode of operation, neither processor 102 nor any external device may initiate a transfer of data into or out of the local memory 104 of processor 102.

In a preferred embodiment, any programs, such as encryption and/or decryption programs, are read from the main memory 106 and/or storage medium 110 prior to entering one of the protected modes. However, in alternative embodiment, once the secure mode of operation is implemented, the processor 102 may read a decryption program from the storage medium 110 into the local memory 104. Preferably, a trusted decryption key is also stored within the storage medium 110 and is also saved into the local memory 104 for later use.

At action 424, the processor 102 preferably enters a protected mode. As previously discussed herein, the protected mode can be either an isolated mode or a secure mode. The isolated mode is preferred. However, in alternative embodiments, the secure mode may be employed.

Preferably, once the processor is in the protected mode, at action 426, the processor 102 decrypts the encrypted modules 612 using the private key and stores the decrypted information in the local memory 104. At action 428, the processor 102 preferably exits the protected mode. At action 430, ongoing program execution preferably resumes in the awakened processor.

In an alternative embodiment, the ongoing program execution paused in action 406 may be resumed in a processor other than the one hibernated in action 414. Preferably, actions 422 through 430 are performed by the other processor to enable resuming ongoing program execution in this manner. The need for performance of action 420 on the "other" processor will depend on whether the other processor is powered up or hibernated prior to starting action 422.

Figure 7:
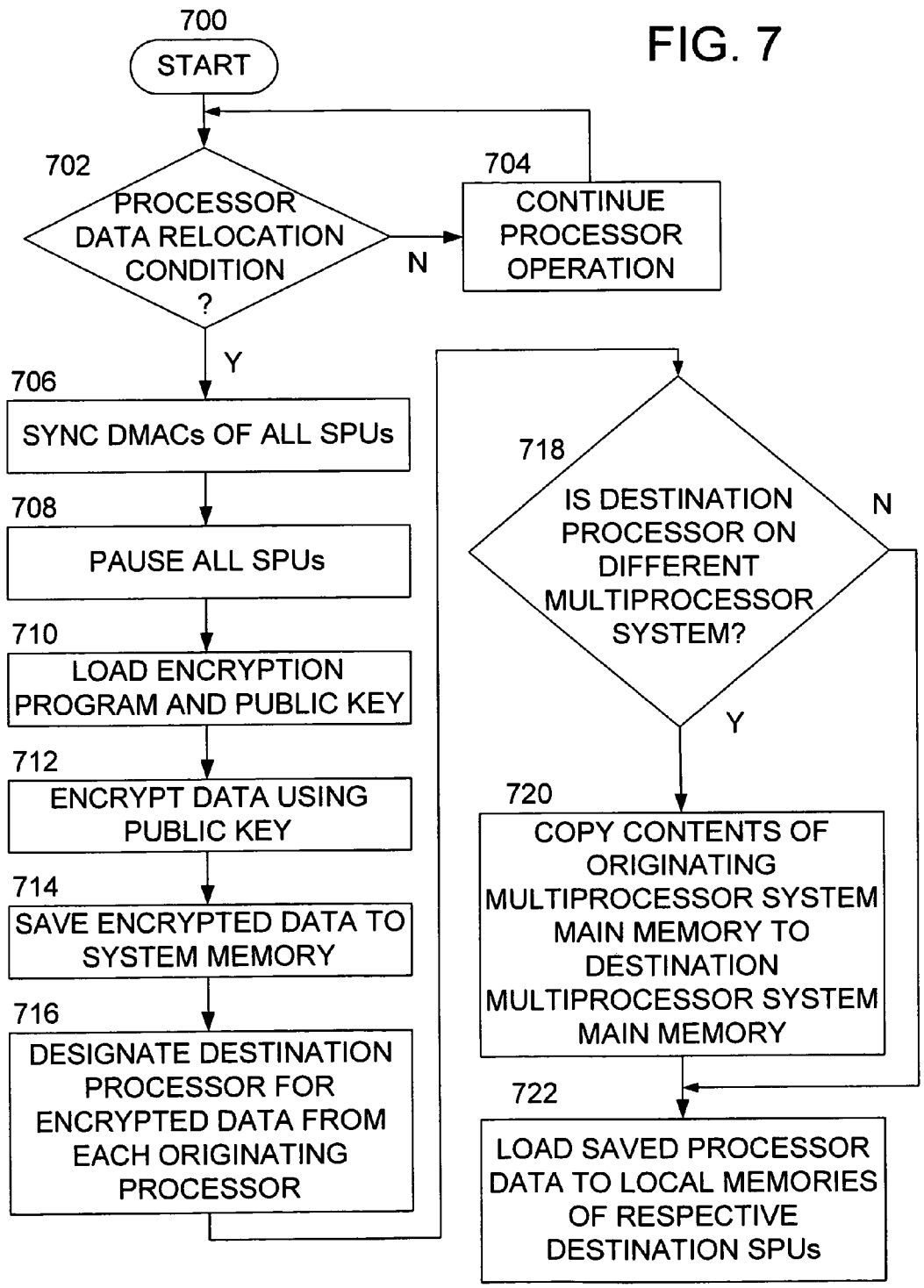
FIG. 7 is a flow diagram illustrating process steps that may be carried out to conduct a processor data relocation procedure in accordance with one or more aspects of the present invention.
Figure 8:
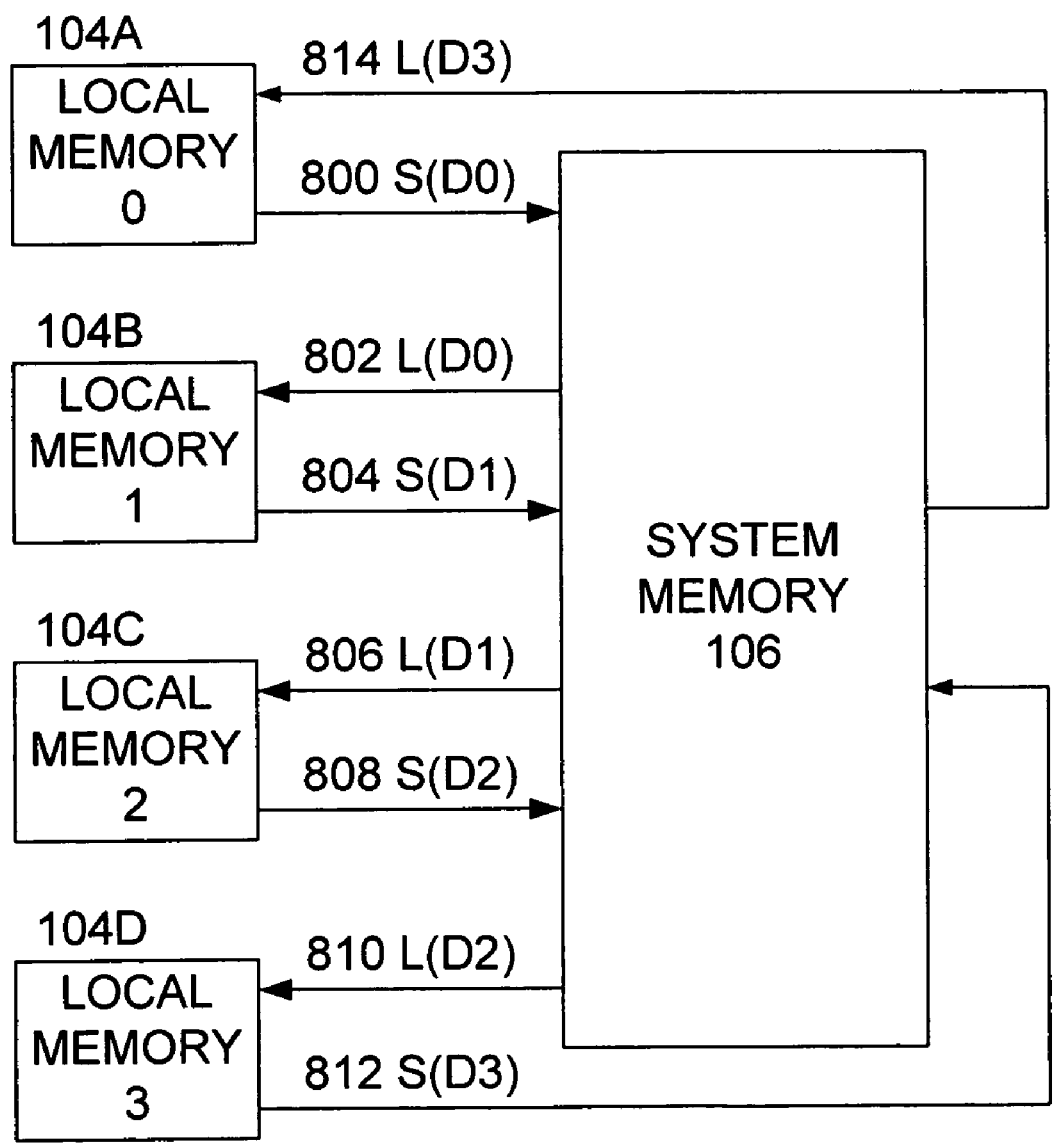
FIG. 8 is a block diagram illustrating data preservation and data restoration portions of a processor data relocation procedure for a plurality of processors in accordance with one or more aspects of the present invention.

FIG. 7 is a flow diagram illustrating process steps that may be carried out to conduct a processor data relocation procedure in accordance with one or more aspects of the present invention. FIG. 8 is a block diagram illustrating data preservation and data restoration portions of a processor data relocation procedure for a plurality of processors in accordance with one or more aspects of the present invention. Reference to FIGS. 7-8 is made below in discussing the process steps of FIG. 7. The method of FIG. 7 is discussed in connection with the multiprocessor system embodiment of FIG. 2 but is not limited to this embodiment.

The process preferably starts at action 700. At action 702, it is determined whether a processor data relocation condition has been established. If no such condition has been established, processor operation continues at action 704. If the processor data relocation condition is established, the process continues at action 706.

The processor data relocation condition is preferably driven by the expiration of an execution period. The execution period preferably has a predetermined duration. However, in alternative embodiments, the duration of the execution period may be determined during ongoing program execution by processor 102. Preferably, during the execution period, the various processors conduct ongoing program execution, preferably without interruption.

In one embodiment, the duration of the execution period may be set based on the SPU's frame rate. In one preferred embodiment, the frame rate is one frame every 16 milliseconds, and the execution period duration is therefore 16 milliseconds (msecs).

In one embodiment, processor 102 prepares data for the presentation of an image on a screen. Each successive image on this screen is a "frame," and the rate at which the frames are processed and presented on the screen is the "frame rate." Since it is generally desirable to complete the processing needed to complete a single frame without interrupting the processor 102, the time needed to complete a single frame by the processor 102 corresponds to a useful and convenient execution period duration. However, in alternative embodiments, execution period durations equal to a multiple of the frame processing time could be employed. In other alternative embodiments, execution period durations smaller than the frame processing time could be employed.

In other embodiments, the time period separating successive processor data relocation procedures may of course be adjusted to match different frame rates. Moreover, in other alternative embodiments, the execution period may have a duration shorter or longer than the frame rate for one or more of the SPUs undergoing processor data relocation.

In a preferred embodiment, the duration of the execution period for a processor is established based on one or more characteristics of the processor 102. The two characteristics most important for determining the execution period are the temperature rate (the rate at which the processor 102 increases in temperature, measured in degrees per second) and the "critical thermal rise time," which is a function of the temperature rate. The "critical thermal rise time." is the time period during which the processor 102 heats up from a normal operating temperature to a critical point. The critical point is a temperature which the processor temperature preferably remains lower than at all times, and which the processor temperature should never rise above. The critical thermal rise time is the time needed for a processor to rise from the normal operating temperature to the critical point when executing a highly demanding application program. Since the power requirements of demanding application programs may vary, the duration of the critical thermal rise time may vary within a range.

In general, the execution period is low enough that power dissipation averaging occurs among the processors among participating in processor data relocation. In one embodiment, the execution period is 50% or less of the critical thermal rise. In another embodiment, the execution period is less or equal to 50% but greater than 35% of the critical thermal rise time. In yet another embodiment, the execution period is less than equal to 35% but greater than 20% of the critical thermal rise time. In yet another embodiment, the execution period is less than or equal to 20% but greater than 10% of the critical thermal rise time. In yet another embodiment, the execution period is less than or equal to 10% of the critical thermal rise time of processor 102. However, the present invention is not limited to the specific ranges of duration stated above for the execution period.

In other alternative embodiments, the processor data relocation condition may be driven by something other than the expiration of a specified time period, such as the occurrence of an event within a computing system in which an SPU is located or which is in communication with one or more SPUs. For example, a workload level (of a processor or of an entire computing system) exceeding a specified threshold could establish a processor data relocation condition. In another embodiment, a thermal condition such as the temperature of a test point (in an SPU or elsewhere in a computing system) rising above a specified threshold could be employed to generate a processor data relocation condition.

At action 706, the DMACs (not shown) of the SPUs 102 are preferably synchronized. At action 708, the operations of the SPUs 102 are preferably paused. Pausing the SPUs 102 preferably includes allowing all direct memory access memory operations to finish and for ongoing program execution to stop.

At action 710, the SPUs 102 preferably load an encryption program and an associated public key into their respective local memories. Preferably, the SPUs 102 within the single multiprocessor system 110A employ a common public key and a common private key. However, in alternative embodiments, different public key/private key pairs may be employed by different SPUs within a multiprocessor system. Where the contents of a particular local memory 104x will be relocated to a processor local memory on a different multiprocessor system, the public key of the destination multiprocessor system should be loaded into that local memory 104x.

At action 712, the data in the respective local memories are preferably encrypted employing the stored public key(s). At action 714, the encrypted data are saved to system memory 106. Referring to FIG. 8, data from the four local memories 104A-104D (LM0-LM3) are saved to system memory 106, in data transfers 800, 804, 808, and 812. In the symbols shown above the data transfer arrows, "S" refers to save, "L" refers to load, "D" refers to data, and the numeral succeeding the letter "D" identifies the number of the local memory the data originated from. Thus "S(D1)" 804 identifies the saving of the data from local memory 1 104B into system memory 106, and L(D1) 806 identifies the loading of the data originating from local memory 1 into local memory 2 104C.

At action 716, the destination processors for the data originating from the respective local memories 104A-104D are designated. It will be appreciated that the "designating" action discussed in this section could be performed at any point prior to the "loading" of action 722. In one embodiment, the processor data relocation scheme employed to perform the designating of action 716 could be fixed for a large number of sequential processor data relocation procedures. Alternatively, this scheme could be selected independently for each processor data relocation procedure.

The block diagram of FIG. 8 illustrates one possible processor data relocation scheme (or "relocation pattern") for mapping the transfer of data from originating processors to destination processors. However, in alternative embodiments, many other processor data relocation schemes may be implemented.

In the illustrative embodiment of FIG. 8, the local memories 104A-104D of four SPUs are shown. Four "save" operations 800, 804, 808, and 812 are shown which operations move data from the respective local memories to system memory 106. Four "load" operations 802, 806, 810, and 814 are also shown. In this embodiment, the processor data relocation scheme simply involves increasing the originating local memory identification number by one, with the obvious exception of data originating from the highest-numbered local memory. Processor data from the highest-numbered local memory is ultimately stored in local memory 0 104A, the lowest-numbered local memory. This relocation scheme is known as "modulo 4" rotation. It is easily understood that this processor data relocation pattern can readily be applied to larger numbers of processors, such as the eight processors found in one embodiment of a multiprocessor system. Thus, in this case, "modulo 8" rotation could be employed. Moreover, where an n-SPU (where "n" is a number of SPUs) multiprocessor system is concerned, a processor data relocation procedure may be practiced on all of the SPUs at once or on any subset of one or more SPUs within this multiprocessor system. In the simplest case, where data for only a single processor is transferred, the processor data relocation scheme corresponds to saving data from this single processor to main memory and subsequently transferring the saved data back to this single processor.

In another embodiment, the tasks within each SIMD (single instruction, multiple data) pipeline, within each processor, may be rotated modulo 4 within each processor to avoid generating any hotspots within each processor. In other embodiments, relocation of data from each pipeline within a given processor may be relocated according to a scheme other than modulo 4. In this manner, pipeline data relocation preferably achieves power dissipation averaging among the various pipelines.

At action 718, for each load operation of data originating from one of the local memories 104A-104d, a determination is preferably made as to whether the destination local memory is on an SPU located on a different multiprocessor system from the originating SPU. If the destination SPU is on the same multiprocessor system as the originating SPU, the process preferably continues at action 722. If the destination SPU and the originating SPU are on different multiprocessor systems, the data of main memory 106 on the originating multiprocessor system are preferably dumped, or copied, to the main memory on the destination multiprocessor system in action 720. This main memory data transfer is preferably implemented to ensure that programs and data originally located in originating-multiprocessor system main memory 106 that are needed to support ongoing operations previously executing on an originating SPU in the originating multiprocessor system are available, as needed, to a destination SPU in the destination multiprocessor system.

At action 722, saved data from the local memories 104A-104D are preferably loaded into the local memories of the respective destination SPUs.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system is preferably able to complete tasks within a short and predictable time period.

To this end, and in accordance with this computer architecture, all processors of a multi-processor computing system are preferably constructed from a common computing module (or cell). This common computing module preferably has a consistent structure and preferably employs the same instruction set architecture throughout. The multi-processor computer system can be formed of one or more clients, servers, PCs, mobile computers, game machines, PDAs, set top boxes, appliances, digital televisions and other devices using computer processors.

One or more of the computer systems may also be members of a network if desired. The consistent modular structure preferably enables efficient, high speed processing of applications and data by the multi-processing computer system, and if a network is employed, the rapid transmission of applications and data over the network. This structure also simplifies the building of members of the network of various sizes, preferably enhances the processing power of each of the members and of the, and preferably facilitates the preparation of applications for processing by these members.

Figure 9:
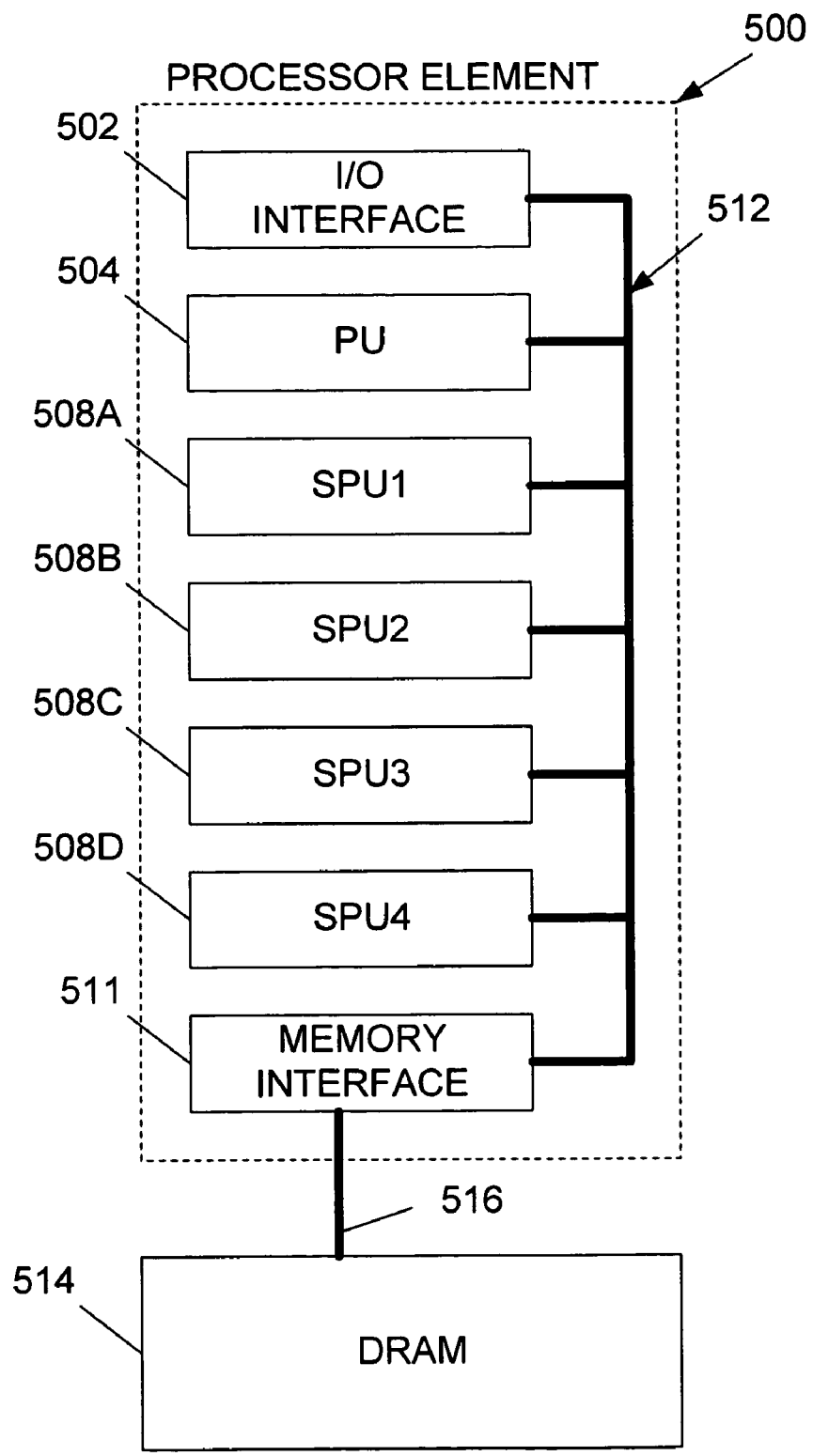
FIG. 9 is a diagram illustrating a preferred processor element (PE) that may be used to implement one or more further aspects of the present invention.

With reference to FIG. 9, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsenide, gallium aluminum arsenide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 10:
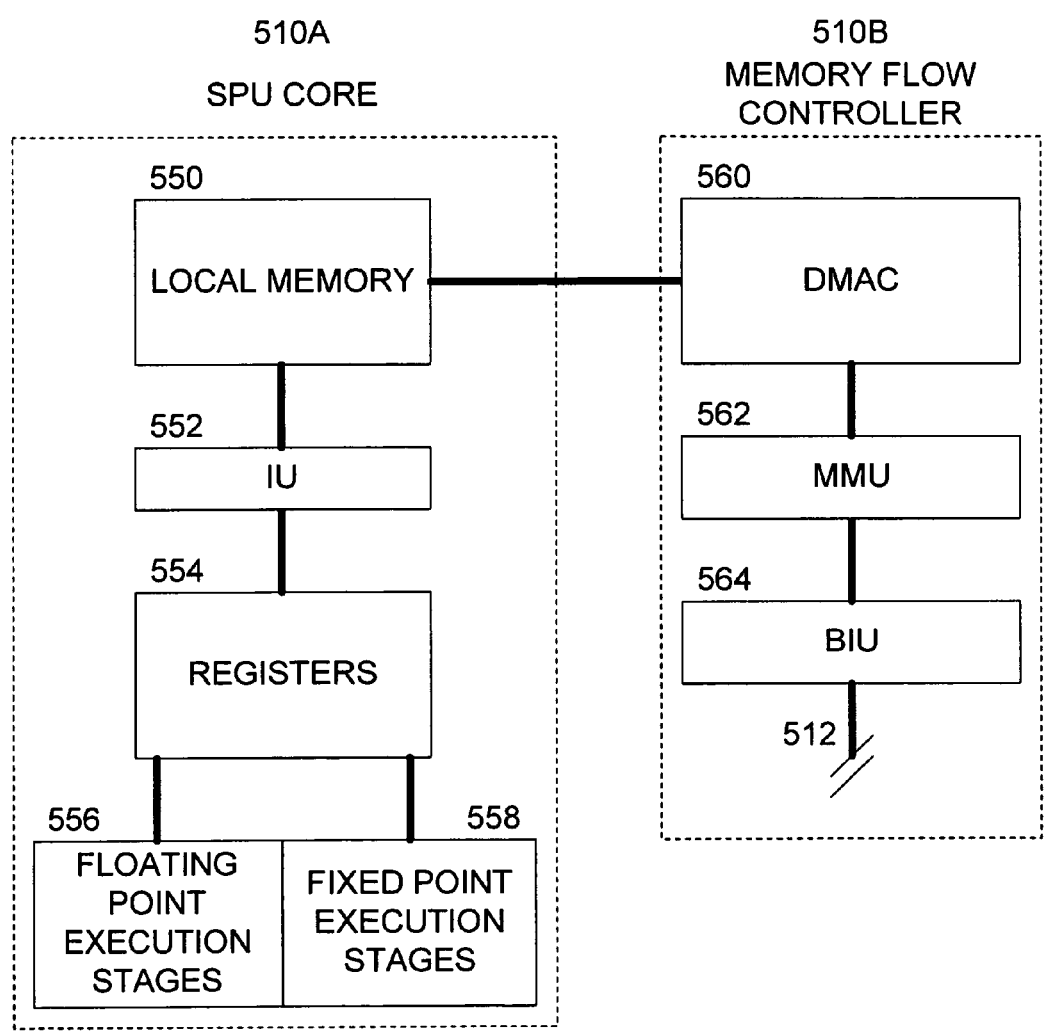
FIG. 10 is a diagram illustrating the structure of an exemplary sub-processing unit (SPU) of the system of FIG. 9 that may be adapted in accordance with one or more further aspects of the present invention.

FIG. 10 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one ore more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 510A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M- byte page sizes and 256 MB segment sizes. Preferably, the MMU 562 is operable to support up to $2^{65}$ bytes of virtual memory, and $24^{42}$ bytes (4 TeraBytes) of physical memory for DMA commands. The hardware of the MMU 562 may include an 8-entry, fully associative SLB, a 256-entry, 4way set associative TLB, and a 4×4 Replacement Management Table (RMT) for the TLB - used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 11:
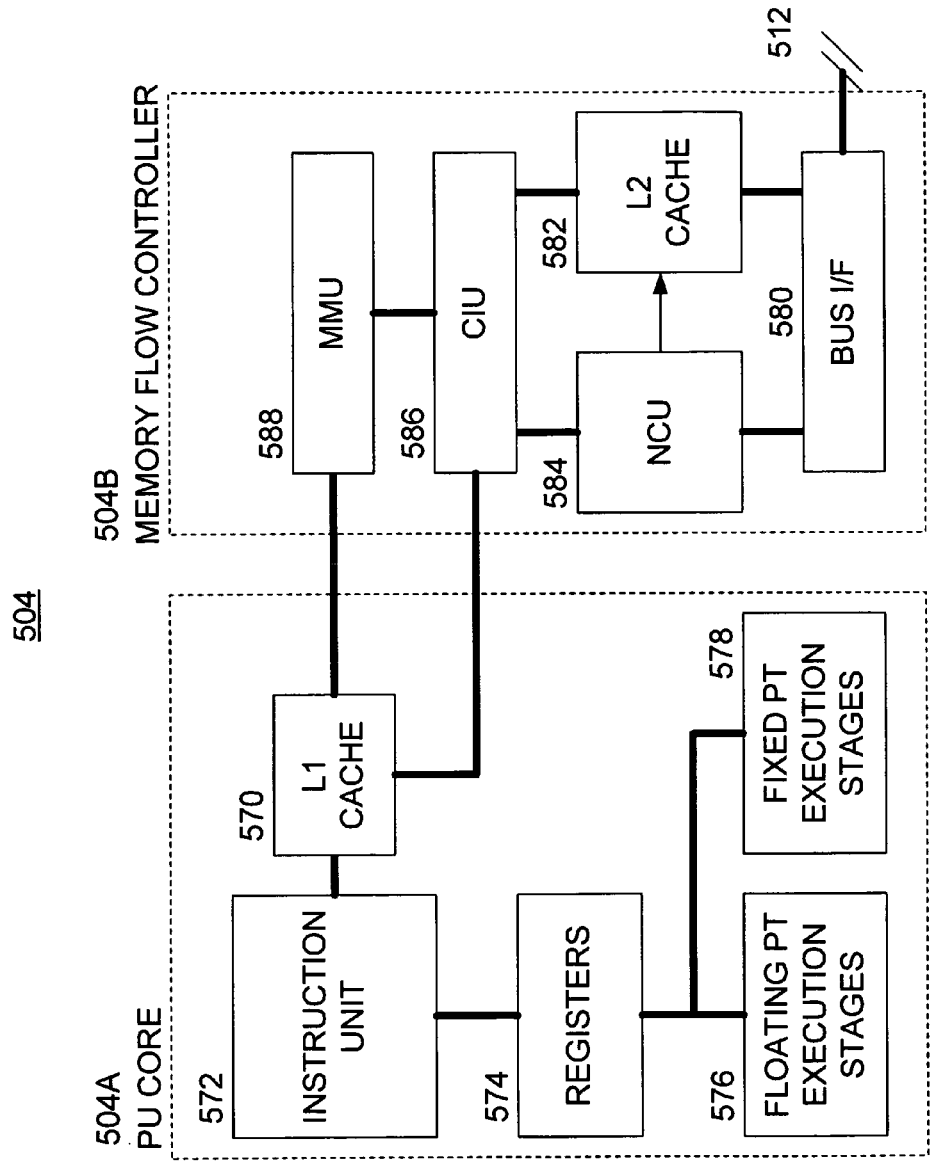
FIG. 11 is a diagram illustrating the structure of an exemplary sub-processing unit (SPU) of the system of FIG. 9 that may be adapted in accordance with one or more further aspects of the present invention.

FIG. 11 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
pausing operation of at least one processor within a multiprocessor system upon encountering at least one of: (i) a checkpoint instruction in a program executing in said at least one processor, and (ii) an expiration of a predetermined execution period;
encrypting data from a local memory of said at least one processor;
saving said data from said local memory of said at least one processor to a main memory of said multiprocessor system, said data including executable program code;
transferring said saved data from said main memory to a local memory of another processor in said multiprocessor system;
causing said other processor to enter a protected mode;
decrypting said transferred encrypted data within said other processor;
causing said other processor to exit said protected mode; and
resuming program execution in said other processor.

2. The method of claim 1, further comprising repeating said steps of pausing, saving, transferring and resuming among a plurality of processors in said multiprocessor system such that power dissipation is distributed among said plurality of processors.

3. The method of claim 1, wherein said execution period is at least one of:
substantially equal to a video frame rate;
about 16 milliseconds; and
substantially less than a thermal rise time of said processors.

4. The method of claim 1, further comprising establishing a processor data relocation scheme among the plurality of processors that dictates for each processor: (i) a destination processor to which said saved data thereof are to be transferred and execution resumed, and (ii) a predecessor processor from which saved data are to be transferred thereto and execution resumed.

5. The method of claim 4, wherein said processor data relocation scheme comprises modulo n rotation, wherein n is a number of the plurality of processors of said multiprocessor system.

6. The method of claim 4, wherein said plurality of processors are disposed within first and second multiprocessor systems coupled to one another.

7. The method of claim 6, wherein said processor data relocation scheme dictates that at least one of the processors located within said first multiprocessor system may have at least one of the destination processor and the predecessor processor thereof located within the second multiprocessor system.

8. The method of claim 7, further comprising copying all said saved data from said main memory of said first multiprocessor system to a main memory of said second multiprocessor system.

9. The method of claim 1, wherein said step of entering said protected mode comprises at least one of:
entering an isolated mode in which data transfer into and out of said other processor is prohibited; and
entering a secure mode in which no requests from a device external to said other processor for data transfer into or out of said other processor will be serviced.

10. The method of claim 1, farther comprising at least one of:
causing said at least one processor to enter hibernation by cutting off at least one of power and a clock thereto;
causing said at least one processor to leave hibernation in response to a wake-up condition;
transferring said saved data from said main memory to said local memory of said at least one processor after said at least one processor has left hibernation; and
causing said at least one processor to resume program execution.

11. The method of claim 10, wherein said step of causing said at least one processor to leave hibernation includes at least one of:
interrupting said at least one processor;
permitting expiration of a predetermined time period; and
executing a checkpoint instruction in a processor in communication with said at least one processor.

12. An apparatus, comprising:
a multiprocessor system having a plurality of processors capable of operative communication with a main memory; and
a local memory coupled to each of said processors, wherein said multiprocessor system is operable to perform actions including:
pausing operation of at least one of said processors upon encountering at least one of: (i) a checkpoint instruction in a program executing in said at least one processor, and (ii) an expiration of a predetermined execution period;
encrypting data in a local memory of said at least one processor;
saving said data from said local memory of said at least one processor to said main memory, said data including executable program code;
causing said other processor to enter a protected mode;
transferring said saved data from said main memory to said local memory of another of said plurality of processors;
decrypting said transferred encrypted data within said other processor;

causing said other processor to exit said protected mode; and resuming program execution in said other processor.

13. The apparatus of claim 12, wherein said multiprocessor system is operable to perform the further action of:

repeating said steps of pausing, saving, transferring and resuming among said plurality of processors in said multiprocessor system such that power dissipation is distributed among said plurality of processors.

14. The apparatus of claim 12, wherein said execution period is at least one of:

substantially equal to a video frame rate;

about 16 milliseconds; and substantially less than a thermal rise time of said processors.

15. The apparatus of claim 12, wherein said multiprocessor system is operable to perform the further action of:

establishing a processor data relocation scheme among said plurality of processors that dictates for each processor: (i) a destination processor to which said saved data thereof are to be transferred and execution resumed, and (ii) a predecessor processor from which saved data are to be transferred thereto and execution resumed.

16. The apparatus of claim 15, wherein said processor data relocation scheme comprises modulo n rotation, wherein n is a number of the plurality of processors of said computing system.

17. The apparatus of claim 15, wherein said plurality of processors are disposed within first and second multiprocessor systems coupled to one another.

18. The apparatus of claim 17, wherein said processor data relocation scheme dictates that at least one of the processors located within said first multiprocessor system may have at least one of the destination processor and the predecessor processor thereof located within the second multiprocessor system.

19. The apparatus of claim 18, wherein said multiprocessor system is operable to perform the further action of:

copying all said saved data from said main memory of said first multiprocessor system to a main memory of said second multiprocessor system.

20. The apparatus of claim 12, wherein said action of entering said protected mode comprises at least one of:

entering an isolated mode in which data transfer into and out of said other processor is prohibited; and entering a secure mode in which no requests from a device external to said other processor for data transfer into or out of said other processor will be serviced.

21. The apparatus of claim 12, further comprising at least one of:

causing said at least one processor to enter hibernation by cutting off at least one of power and a clock thereto;

causing said at least one processor to leave hibernation in response to a wake-up condition;

transferring said saved data from said main memory to said local memory of said at least one processor after said at least one processor has left hibernation; and causing said at least one processor to resume program execution.

22. The apparatus of claim 21, wherein said action of causing said at least one processor to leave hibernation includes at least one of:

interrupting said at least one processor;

permitting expiration of a predetermined time period; and executing a checkpoint instruction in a processor in communication with said at least one processor.

23. A storage medium containing an executable program, the executable program being operable to cause a multiprocessor system to execute actions comprising:

pausing operation of at least one processor within said multiprocessor system upon encountering at least one of: (i) a checkpoint instruction in a program executing in said at least one processor, and (ii) an expiration of a predetermined execution period;

encrypting data in a local memory of said at least one processor;

saving data from said local memory of said at least one processor to a main memory of said multiprocessor system, said data including executable program code;

causing said other processor to enter a protected mode;

transferring said saved data from said main memory to a local memory of another processor in said multiprocessor system;

decrypting said transferred encrypted data within said other processor;

causing said other processor to exit said protected mode; and resuming program execution in said other processor.

24. A method, comprising:

establishing a processor data relocation scheme among the plurality of processors, where said processor data relocation scheme comprises modulo n rotation, wherein n is a number of the plurality of processors of said multiprocessor system, the processor data relocation scheme dictating for each processor: (i) a destination processor to which said saved data thereof are to be transferred and execution resumed, and (ii) a predecessor processor from which saved data are to be transferred thereto and execution resumed;

pausing operation of at least one processor within a multiprocessor system upon encountering at least one of: (i) a checkpoint instruction in a program executing in said at least one processor, and (ii) an expiration of a predetermined execution period;

saving data from a local memory of said processor to a main memory of said multiprocessor system, said data including executable program code;

transferring said saved data from said main memory to a local memory of a destination processor in said multiprocessor system according to said processor data relocation scheme; and resuming program execution in said destination processor.

25. The method of claim 24, wherein said processor data relocation scheme dictates that at least one of the processors located within said first multiprocessor system may have at least one of the destination processor and the predecessor processor thereof located within the second multiprocessor system.

26. An apparatus, comprising:

a multiprocessor system having a plurality of processors capable of operative communication with a main memory; and a local memory coupled to each of said processors, wherein said multiprocessor system is operable to perform actions including:

facilitating a processor data relocation scheme among the plurality of processors, where said processor data relocation scheme comprises modulo n rotation, wherein n is a number of the plurality of processors of said multiprocessor system, the processor data relocation scheme dictating for each processor: (i) a destination processor to which said saved data thereof are to be transferred and execution resumed, and (ii) a predecessor processor from which saved data are to be transferred thereto and execution resumed;

pausing operation of at least one processor within a multiprocessor system upon encountering at least one of: (i) a checkpoint instruction in a program executing in said at least one processor, and (ii) an expiration of a predetermined execution period;

saving data from a local memory of said processor to a main memory of said multiprocessor system, said data including executable program code;

transferring said saved data from said main memory to a local memory of a destination processor in said multiprocessor system according to said processor data relocation scheme; and resuming program execution in said destination processor.

* * * * *